Patented Sept. 20, 1927.

1,643,181

UNITED STATES PATENT OFFICE.

GEORGE K. SCHLOTTERER, OF CHESTER, AND ROBERT H. YOUNGMAN, OF PITTSBURGH, PENNSYLVANIA, ASSIGNORS TO HARBISON-WALKER REFRACTORIES COMPANY, OF PITTSBURGH, PENNSYLVANIA, A CORPORATION OF PENNSYLVANIA.

UNBURNED REFRACTORY BRICK.

No Drawing.   Application filed May 15, 1926.   Serial No. 109,430.

This invention relates to refractory bricks and shapes, and more particularly to those composed of dead-burned magnesite bound together with sodium silicate, molded to shape and dried, but not burned after molding.

The general object of the invention is to make a basic brick or shape of dead-burned refractory material, such as magnesite, strong enough to be handled, stored, shipped, and built into furnaces or the like without burning and without deterioration from atmospheric exposure. These objects are secured by a special bonding, setting and drying treatment. Although brick are primarily intended, and are spoken of throughout this specification, it will be understood that analagous shapes are included.

Refractory compositions in brick form comprising dead-burned magnesite and similar refractories are well known. Also combinations of such refractory materials with binders of various kinds, including sodium silicate, and for various purposes, are known. But heretofore it has not been practicable to make bricks from previously dead-burned magnesite with sodium silicate as a binder, without burning after molding, although sodium silicate has long been known and used as a binder in connection with refractories and has even been tried experimentally with dead-burned magnesite for making brick, but without practical success, unless the brick was burned after molding. The difficulty has been that sodium silicate with dead-burned magnesite seemed to lack sufficient strength as a bond for brick when used in a permissible proportion. Dead-burned magnesite is quite porous and absorptive, and tends to soak up a liquid binder readily. If enough sodium silicate is used to make a hard sharp brick without burning the refractory property of the brick is too low. If an amount less than 10% of sodium silicate is used, the binder seems to be absorbed by the magnesite, and the result is a crumbly brick of insufficient strength for handling and use, unless it is burned.

Sodium silicate has the property of sticking and setting hard and can be mixed with magnesite either in solution or dry, water to be added after mixing. It has been used successfully for making unburned brick of chrome, as for example that described in Youngman Patent No. 1,564,394. But prior to the present invention it was apparently impracticable to make brick of dead-burned magnesite, without burning, with a permissible amount of binder of sodium silicate, because such bricks when dried were not structurally strong enough to stand shipping and handling.

The present invention is based upon the discovery that a brick or shape may be made of dead-burned magnesite, by binding with not over 10% of sodium silicate, and then putting the molded brick or shape through a special setting and drying process, initially in a humid atmosphere. This special setting and drying makes possible the production of an unburned magnesite brick with not over 10% of sodium silicate binder.

The preferred application of this invention is the mixture of from 90 to 95% of dead-burned powdered magnesite with from 10 to 5% of dry powdered sodium silicate, then the addition of sufficient water to secure plasticity, molding or pressing into the required bricks or shapes, and then drying. Sodium silicate in solution may be used instead but there are very decided advantages to the dry mixture and addition of water. The result is a strictly basic brick. While the process described may be valuable for other porous refractory products where a binder of sodium silicate is used, the most valuable application of the invention appears to be in the making of a commercially acceptable unburned brick from dead-burned magnesite and sodium silicate, such a product having been previously very much desired by the trade, but not available by previously used processes of making.

After molding the moist bricks are put through a special setting and drying process. This consists in placing the moist bricks or shapes as they come from the press on rack cars which are then moved to a tunnel dryer in which there is complete control of humidity, within range from saturation down. Preferably the bricks are set and dried in stages, the first, which may be called an initial setting stage, is continued for about ten hours, the humidity being maintained from 75% upward, and the temperature at about 130° Fahrenheit. The second stage, which may be called a setting and drying period, lasts for about thirty hours, the humidity being reduced to about 60% and the temperature increased to about 160° F. Or, as the second stage the time may be shortened to about twenty-four hours, if the temperature is increased to from 180° to 200° F., the humidity being maintained at about 60%. Then a third and final drying stage follows in which humidity is reduced as low as possible, the temperature being preferably maintained at about 200° F. for about forty-eight hours. This is for drying, and the time and temperature are apparently not critical, provided humidity is kept as near zero as possible. For example, heating to 180° for about seventy-two hours, or 120° for about one hundred forty-four hours, appear to be substantially equivalent to the time and temperature first mentioned for this third stage.

After the bricks have gone through this gradual setting and drying process at low temperatures, and initially set in an atmosphere of high humidity and comparatively low temperature, they are found to be hard, dry, of strong structure, permanently bound, and they may be stored for long periods without deterioration from atmospheric exposure. They are strong enough to stand handling, shipment, and use, and consequently without any further treatment may be built into furnace structures with satisfactory results.

It is believed that the temperatures, times and humidity percentages above given are not critical, and that these elements may be varied within a reasonable range. The ranges and stages given are those that have been found in actual production to be practicable and so far as observation goes, appear to be those best suited for attaining the desired end.

The material elements of the process seem to be that the moist bricks from the press shall go through a stage of initial setting in an atmosphere of high humidity, followed by a slow drying treatment, at comparatively low temperature. The humidity is reduced progressively and the drying terminates in a period of application of mild heat in an atmosphere of minimum or zero humidity. Just what the individual effects of these steps are is not fully apparent. Probably the setting of the sodium silicate takes place in the first two stages, in the presence of considerable moisture, and this prevents its migrating to the surface and its forming into crystals. The results seem to be to permit the sodium silicate by this setting slowly and initially in a moist air, to bind uniformly throughout the brick without crystallizing unequally as it apparently has a tendency to do when the moist brick is heated initially in a dry atmosphere. At any rate, this process of drying results in a hard, strong, permanent structure when the brick is finally dried, with a permissible amount of binder, whereas the methods heretofore used have not produced a brick that could be stored, shipped, and built into furnaces. Consequently it has heretofore been considered and in fact has been impracticable to produce commercially acceptable unburned brick of dead-burned magnesite bonded with sodium silicate.

The many advantages of an unburned brick of dead-burned magnesite with low percentage of binder strong enough to handle and ship without having to undergo the expense of burning will be readily apparent to those familiar with the art of manufacture and use of such bricks.

We claim:

1. In the making of unburned refractory brick comprising a binder of sodium silicate, the process of initially storing the raw brick for a material period in an atmosphere of high humidity.

2. In the making of unburned refractory brick comprising a binder of not over 10% of sodium silicate, the process of initially storing the raw brick for a material period in an atmosphere of high humidity.

3. In the making of unburned refractory brick comprising a binder of sodium silicate, the process of initially storing the raw brick in an atmosphere of high humidity, then drying in an atmosphere of comparatively low humidity.

4. In the making of unburned refractory brick comprising a binder of sodium silicate, the process of initially storing the raw brick in an atmosphere of high humidity and comparatively low temperature, thereafter drying the brick in an atmosphere of comparatively low humidity and increased temperature.

5. In the making of unburned refractory brick comprising a binder of sodium silicate, the process of treatment comprising first slightly heating the raw brick in an atmosphere of high humidity for a material period, and thereafter progressively reducing the humidity until the brick is dry.

6. In the making of unburned refractory brick comprising a binder of sodium silicate, the process of treatment comprising first slightly heating the raw brick in an atmosphere of high humidity for a material period, and thereafter progressively decreasing the humidity and increasing the temperature until the brick is dry.

7. In the making of unburned refractory brick comprising dead-burned magnesite with a binder of sodium silicate, the process of initially storing the raw brick for a setting period in an atmosphere of high humidity.

8. In the making of unburned refractory brick comprising dead-burned magnesite with a binder of not over 10% of sodium silicate, the process of initially storing the raw brick for a setting period in an atmosphere of high humidity.

9. In the making of unburned refractory brick comprising dead-burned magnesite with a binder of sodium silicate, the process of initially storing the raw brick for a setting period in an atmosphere of high humidity, then drying in an atmosphere of comparatively low humidity.

10. In the making of unburned refractory brick comprising dead-burned magnesite with a binder of sodium silicate, the process of initially storing the raw brick for a setting period in an atmosphere of high humidity and comparatively low temperature, thereafter drying the brick in an atmosphere of comparatively low humidity and increased temperature.

11. In the making of unburned refractory brick comprising dead-burned magnesite with a binder of sodium silicate, the process of treatment comprising first storing the raw brick in a warm atmosphere of high humidity for a material period, and thereafter progressively decreasing the humidity until the brick is dry.

12. In the making of unburned refractory brick comprising dead-burned magnesite with a binder of sodium silicate, the process of treatment comprising first storing the raw brick in a warm atmosphere of high humidity for a material period, and thereafter progressively decreasing the humidity and increasing the temperature of the atmosphere until the brick is dry.

13. The process of making unburned refractory brick consisting of dead-burned magnesite with a binder of sodium silicate, comprising the steps of initially storing the raw brick in an atmosphere of not less than 75% humidity for a period of not less than ten hours, and thereafter drying the brick in an atmosphere of reduced humidity and increased temperature.

14. The process of making unburned refractory brick consisting of dead-burned magnesite with a binder of sodium silicate, comprising the steps of initially storing the raw brick in an atmosphere of not less than 75% humidity for a period of not less than ten hours, then storing the brick for a secondary setting period in an atmosphere of not less than 60% humidity for a longer time, then drying.

15. A finished unburned basic refractory brick comprising dead-burned magnesite and a binder of sodium silicate.

16. A finished unburned refractory brick comprising not less than 90% of dead-burned magnesite, and not more than 10% of sodium silicate.

In testimony whereof, we hereunto sign our names.

GEORGE K. SCHLOTTERER.
ROBERT H. YOUNGMAN.